United States Patent
Jo et al.

(10) Patent No.: US 10,591,655 B2
(45) Date of Patent: Mar. 17, 2020

(54) OPTICAL FILM, LIQUID CRYSTAL DISPLAY DEVICE INCLUDING SAME, AND MANUFACTURING METHOD THEREFOR

(71) Applicant: SAMSUNG SDI CO., LTD., Yongin-si, Gyeonggi-do (KR)

(72) Inventors: A Ra Jo, Suwon-si (KR); Bae Wook Lee, Suwon-si (KR); Lee Hwa Song, Suwon-si (KR); Ki Ho Park, Suwon-si (KR); Boem Deok Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 37 days.

(21) Appl. No.: 15/540,018

(22) PCT Filed: May 13, 2015

(86) PCT No.: PCT/KR2015/004811
§ 371 (c)(1),
(2) Date: Jun. 26, 2017

(87) PCT Pub. No.: WO2016/108352
PCT Pub. Date: Jul. 7, 2016

(65) Prior Publication Data
US 2017/0371082 A1    Dec. 28, 2017

(30) Foreign Application Priority Data
Dec. 31, 2014    (KR) .................. 10-2014-0195292

(51) Int. Cl.
*G02B 5/30* (2006.01)
*G02B 27/28* (2006.01)
(Continued)

(52) U.S. Cl.
CPC ............ *G02B 5/3033* (2013.01); *B29C 55/02* (2013.01); *B29C 55/12* (2013.01); *G02B 1/14* (2015.01); *G02B 5/30* (2013.01); *B29K 2029/04* (2013.01)

(58) Field of Classification Search
CPC .... G02B 5/3033; G02B 5/305; G02B 5/3083; G02B 1/14; G02B 1/08; G02B 5/3025; G02B 5/3016; G02B 5/30; G02B 5/3041
(Continued)

(56) References Cited

U.S. PATENT DOCUMENTS 8,520,171 B2 *    8/2013    Kitagawa .............. B29C 55/026
349/96
9,423,542 B2 *    8/2016    Bae .................. B29D 11/00644
(Continued)

FOREIGN PATENT DOCUMENTS

CN    1623106 A    6/2005
CN    102540315 A    7/2012
(Continued)

OTHER PUBLICATIONS

International Search Report for corresponding PCT Application No. PCT/KR2015/004811, dated Sep. 17, 2015 (5 pages).
(Continued)

*Primary Examiner* — William R Alexander
*Assistant Examiner* — Tamara Y. Washington
(74) *Attorney, Agent, or Firm* — Lewis Roca Rothgerber Christie LLP

(57) ABSTRACT

The present invention relates to an optical film including a polarizing film, and a manufacturing method therefor. The optical film of the present invention can include the polarizing film having an orthogonal transmittance of less than 0.5% in a wavelength of a range of 405-735 nm.

4 Claims, 1 Drawing Sheet

(51) Int. Cl.
*B29C 55/02* (2006.01)
*B29C 55/12* (2006.01)
*G02B 1/14* (2015.01)
*B29K 29/00* (2006.01)

(58) Field of Classification Search
USPC ........................................ 359/487.02–494.01
See application file for complete search history.

(56) References Cited

U.S. PATENT DOCUMENTS

| | | | |
|---|---|---|---|
| 2004/0212885 | A1 | 10/2004 | Mizushima et al. |
| 2012/0170117 | A1* | 7/2012 | Cho ..................... G02B 5/3033 359/487.01 |
| 2012/0200811 | A1* | 8/2012 | Sakai .................. G02F 1/13363 349/102 |
| 2015/0033984 | A1* | 2/2015 | Hisakado ............. G02B 5/3033 106/162.9 |

FOREIGN PATENT DOCUMENTS

| | | |
|---|---|---|
| CN | 102834748 A | 12/2012 |
| JP | 07-181476 A | 7/1995 |
| JP | 3981638 B2 | 9/2007 |
| JP | 2012-003173 A | 1/2012 |
| JP | 2012-068677 A | 4/2012 |
| KR | 10-2004-0093046 A | 11/2004 |
| KR | 10-2010-0129509 A | 12/2010 |
| KR | 10-2011-0115728 A | 10/2011 |
| KR | 20110138529 A † | 12/2011 |

OTHER PUBLICATIONS

Written Opinion for corresponding PCT Application No. PCT/KR2015/004811, dated Sep. 17, 2015 (6 pages).
Chinese Office action dated Nov. 28, 2018 for corresponding Chinese Application No. 201580071626.4 (6 pgs.).
China Office action dated Jul. 9, 2019 in corresponding China Patent Application No. 201580071626.4 (6 pgs.).

\* cited by examiner
† cited by third party

[Fig. 1]
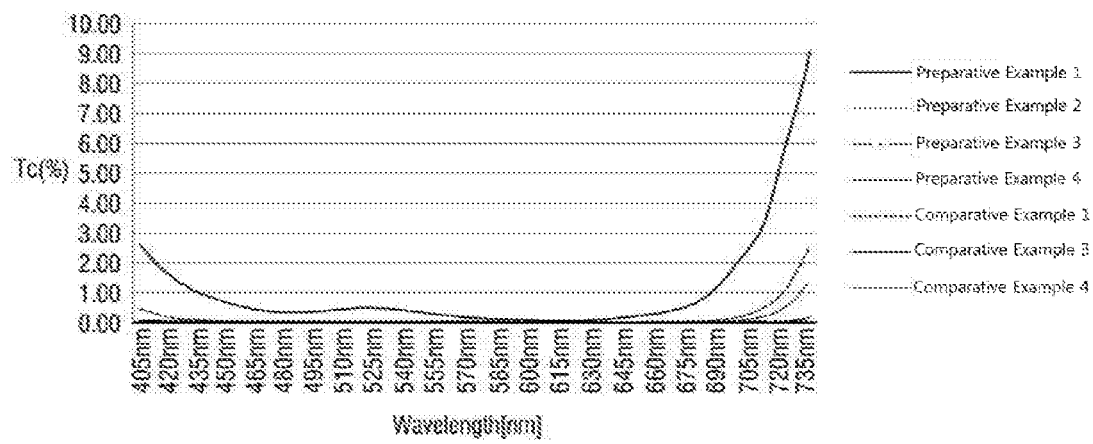
[Fig. 2]
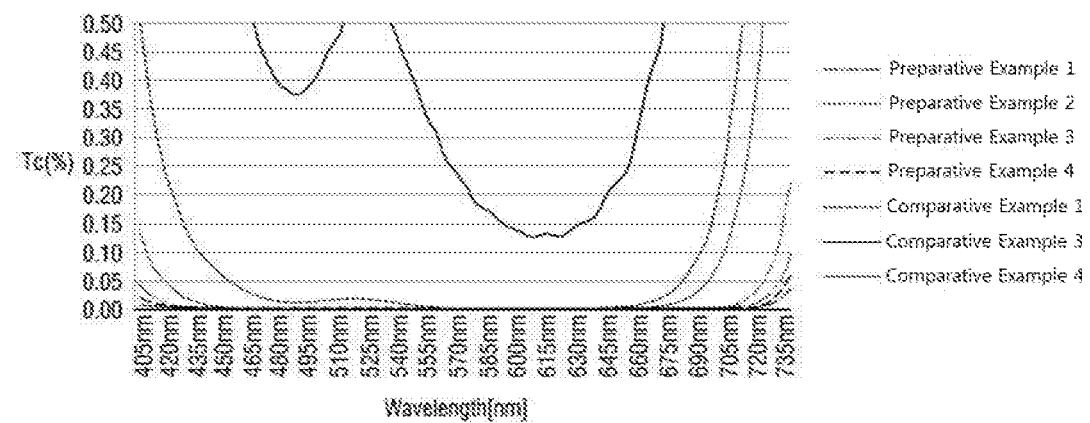

OPTICAL FILM, LIQUID CRYSTAL DISPLAY DEVICE INCLUDING SAME, AND MANUFACTURING METHOD THEREFOR

CROSS-REFERENCE TO RELATED APPLICATIONS

This Application is a National Phase Patent Application and claims priority to and the benefit of International Application Number PCT/KR2015/004811, filed on May 13, 2015, which claims priority to and the benefit of Korean Application No. 10-2014-0195292, filed on Dec. 31, 2014, the entire contents of each of which are incorporated herein by reference.

BACKGROUND

1. Field

The present invention relates to an optical film, a liquid crystal display including the same, and a method of manufacturing the same.

2. Description of the Related Art

Polarizing plates are used inside and outside a liquid crystal cell for the purpose of controlling an oscillation direction of light in order to visualize a display pattern of a liquid crystal display. Recently, liquid crystal displays are applied to a wide range of applications from small devices in the early stage of development up to notebook computers, liquid crystal monitors, liquid crystal color projectors, liquid crystal televisions, in-vehicle navigation systems, personal phones, measurement devices used indoors and outdoors, and the like. In particular, a liquid crystal monitor, a liquid crystal television, and the like generally employ a high brightness backlight.

Recently, with the trend of reducing thicknesses of displays, thickness reduction of internal components is also required. Thus, thicknesses of polarizing films used for polarizing plates are also required to become smaller than those of typical products.

Therefore, there is a need for an optical film including a polarizing film, which has a reduced thickness and exhibits good optical properties, and a method of fabricating the same.

SUMMARY

It is one aspect of the present invention to provide an optical film including a polarizing film and exhibiting good optical properties.

It is another aspect of the present invention to provide a method of manufacturing the optical film including the polarizing film as set forth above.

The above and other aspects of the present invention will become apparent to those skilled in the art from the detailed description of the following embodiments in conjunction with the accompanying drawings.

In accordance with one aspect of the present invention, an optical film may include a polarizing film having an orthogonal transmittance of less than 0.5% at a wavelength of 405 nm to 735 nm.

The polarizing film may have a thickness of 0.5 μm to 15 μm.

The polarizing film may have a degree of alignment of 20% to 48%.

The optical film may include a protective film bonded to at least one surface of the polarizing film.

In accordance with another aspect of the present invention, an optical film may include a polarizing film, which has an absolute value of a slope of 0.01 or less at a wavelength of 405 nm to 460 nm or an absolute value of a slope of 0.1 or less at a wavelength of 460 nm to 735 nm on a graph having horizontal and vertical axes indicating wavelength and orthogonal transmittance, respectively, the slope being represented by Equation 1.

Slope (%/nm)=(Orthogonal transmittance change amount (%))/Wavelength change amount (nm))  (Equation 1)

The polarizing film may have a thickness of 0.5 μm to 15 μm.

The polarizing film may have a degree of alignment of 20% to 48%.

The optical film may include a protective film bonded to at least one surface of the polarizing film.

In accordance with a further aspect of the present invention, a method of manufacturing an optical film may include: dyeing a polyvinyl alcohol film with iodine or a dichroic dye; and stretching the polyvinyl alcohol film, wherein a stretching ratio before dyeing may be less than a stretching ratio after dyeing.

The stretching ratio before dyeing may be less than the stretching ratio after dyeing by 40% or less.

The polyvinyl alcohol film may have a final stretching ratio of 5.0:1 or more.

The method may further include bonding a protective film to at least one surface of the polarizing film.

The method may further include swelling the polyvinyl alcohol film in a swelling bath, and swelling may be performed at a temperature of 40° C. to 80° C.

Details of other embodiments will be described in the detailed description with reference to the accompanying drawings.

Embodiments of the present invention provide at least the following effects.

The optical film according to the present invention may include a polarizing film having a reduced thickness and good properties.

It should be understood that advantageous effects according to the present invention are not limited to the effects set forth above and other advantageous effects of the present invention will be apparent from the detailed description of the present invention.

BRIEF DESCRIPTION OF THE DRAWINGS

FIGS. 1 and 2 are graphs depicting a relationship between orthogonal transmittance and wavelength, as measured on polarizing films of Preparative Examples and Comparative Examples.

DETAILED DESCRIPTION

The advantages and features of the present invention and methods of achieving the advantages and features will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art.

The scope of the present invention should be defined only by the accompanying claims and equivalents thereof.

It should understood that, when an element or layer is referred to as being placed "on" another element or layer, it can be directly placed on the other element or layer, or intervening element(s) or layer(s) may also be present. Like components will be denoted by like reference numerals throughout the specification.

It should be understood that, although terms such as "first", "second" and the like may be used herein to describe various components, these components are not limited by these terms. These terms are used only to distinguish one component from another component. Therefore, a first component could be termed a second component without departing from the scope and spirit of the present invention.

In addition, it should be understood that, unless operations included in a manufacturing method described herein are specified as being sequential or consecutive, or stated otherwise, one operation and another operation included in the manufacturing method should not be construed as being limited to an order described herein. Therefore, it should be understood that an order of operations included in a manufacturing method can be changed within the range of easy understanding of those skilled in the art, and that, in this case, incidental changes obvious to those skilled in the art are within the scope of the present invention.

Optical Film

Hereinafter, an optical film according to one embodiment of the present invention will be described in detail.

The optical film according to one embodiment of the present invention includes a polarizing film having an orthogonal transmittance of less than 0.5%, preferably greater than 0% and less than 0.5% at a wavelength of 405 nm to 735 nm.

The wavelength refers to a wavelength of light. Within this range, the orthogonal transmittance of the polarizing film satisfies the condition of less than 0.5%, and thus the polarizing film has a high degree of polarization and undergoes less light loss, thereby realizing a true black color when the optical film is applied to a liquid crystal display.

More specifically, a low orthogonal transmittance means that a low amount of light is lost when polarizing films are orthogonal, and means that the polarizing film has a high degree of polarization due to good alignment of iodine in the polarizing film. Therefore, according to the present invention, the optical film has an orthogonal transmittance of less than 0.5% at a wavelength of 405 nm to 735 nm, thereby realizing good degree of polarization.

In other words, a high orthogonal transmittance means that alignment of iodine in the polarizing film is poor and that the polarizing film has a poor degree of polarization and suffers from light loss. Therefore, when a polarizing film having a high orthogonal transmittance is applied to a liquid crystal display, it can be difficult to realize a true black color in the liquid crystal display since the polarizing film has a low degree of polarization and suffers from high light loss.

Orthogonal transmittance refers to transmittance measured after two polarizing plates are arranged such that absorption axes thereof are orthogonal. In addition, measurement of the orthogonal transmittance may be performed using a UV-vis spectrophotometer (V-7100, Jasco Co., Ltd.) as a measurement device as follows: with a sample attached to a dedicated jig having a central circular hole, the jig is inserted into a stage, followed by measurement under the condition of C light source 2 degree visual field in accordance with JIS Z8701, thereby obtaining a visibility-corrected Y value as the orthogonal transmittance of the sample.

The polarizing film may have a thickness of 0.5 µm to 15 µm, for example, 2 µm to 13 µm, or 4 µm to 9 µm. If the thickness of the polarizing film is 0.5 µm or more, thickness reduction can be achieved in a process and if the thickness of the polarizing film is 15 µm or less, the polarizing film can be applied to a thin film device or the like.

The polarizing film may have a degree of alignment of 20% to 48%, for example, 25% to 48%, or 30% to 48%. Within this range, the polarizing film can exhibit good polarization properties.

The degree of alignment is defined as a ratio of an alignment of iodine or a dichroic material to an alignment of polyvinyl alcohol molecules, and may be used as an indicator of how exactly iodine or the dichroic material is aligned with the polyvinyl alcohol molecules. The degree of alignment may be calculated by an expression $(R_I/R_{pva}) \times 100$, wherein $R_I$ represents the alignment of the dichroic material and $R_{pva}$ represents the alignment of the polyvinyl alcohol.

The degree of alignment is measured using a retardation measurement device KOBRA-WX100/IR (OSI Co., Ltd.). The retardation measurement device is a polarization analyzer using a parallel Nicol rotation method and is used to calculate the degree of alignment by measuring retardation profiles of a polyvinyl alcohol matrix and urea from angle dependency of transmitted light intensity when a polarizer is rotated around a beam axis once in a parallel Nicol state while being irradiated with a single wavelength luminous flux.

In a specific method of measuring the degree of alignment, with a sample secured flat to a light source position, a measurement wavelength range and a measurement position are set and measurement is started. After completion of measurement, an overall order value for Rc/Ro is adjusted and the degree of alignment is calculated from a value obtained based on stored data.

A high degree of alignment means that a dichroic material has high alignment with respect to polyvinyl alcohol molecules, and means that a polarizing plate exhibits high polarization properties and improved durability and suffers from less light loss, thereby allowing a true black color to be realized on a liquid crystal display. Therefore, the polarizing film according to the present invention satisfies the range of the degree of alignment as set forth above, thereby exhibiting good polarization properties and durability and realizing a true black color when applied to a liquid crystal display.

The optical film may include a protective film bonded to at least one surface of the polarizing film. The protective film can protect the polarizing film from external impact, moisture penetration or the like, and can prevent deterioration in polarization properties of the polarizing film due to leakage of a dichroic dye, that is, a component such as iodine, from the polarizing film.

The protective film may be bonded only to one surface of the polarizing film, without being limited thereto. The protective film may be bonded to both surfaces of the polarizing film. When the protective film is bonded only to one surface of the polarizing film, the thickness of the optical film including the polarizing film can be reduced.

An optical film according to another embodiment of the present invention may include a polarizing film, which has an absolute value of a slope of 0.01 or less or greater than 0 and 0.01 or less at a wavelength of 405 nm to 460 nm on a graph having horizontal and vertical axes indicating measurement wavelength and orthogonal transmittance, respectively, in which the slope is represented by Equation 1. In addition, the optical film may include a polarizing film, which has an absolute value of a slope of 0.1 or less or greater than 0 and 0.1 or less at a wavelength of 460 nm to 735 nm. Preferably, the polarizing film has an absolute value of a slope of 0.01 or less or greater than 0 and 0.01 or less at a wavelength of 405 nm to 410 nm and an absolute value of a slope of 0.1 or less or greater than 0 and 0.1 or less at a wavelength of 730 nm to 735 nm on the graph having the horizontal and vertical axes indicating the measurement wavelength and orthogonal transmittance, respectively, in which the slope is represented by Equation 1.

Slope (%/nm)=(Orthogonal transmittance change amount (%))/Wavelength change amount (nm))  (Equation 1)

In other words, when the graph is plotted by defining the horizontal and vertical axes as the measurement wavelength and orthogonal transmittance, respectively, the slope represented by Equation 1 refers to a slope at each point, and this is a numerical value obtained by dividing an orthogonal transmittance change amount (%) along the vertical axis by a wavelength change amount (nm) along the horizontal axis. According to the present invention, the slope represented by Equation 1 is defined as an absolute value and has a positive value. Within the range as set forth above, the polarizing film can realize a good degree of polarization, thereby realizing a true black color.

The polarizing film may have a thickness of 0.5 μm to 15 μm, for example, 2 μm to 13 μm, or 4 μm to 9 μm. If the thickness of the polarizing film is 0.5 μm or more, thickness reduction can be achieved in a process, and if the thickness of the polarizing film is 15 μm or less, the polarizing film can be applied to a thin film device or the like.

In addition, the polarizing film may have a degree of alignment of 20% to 48%, for example, 25% to 48%, or 30% to 48%. Here, the degree of alignment is defined as a ratio of an alignment of a dichroic material such as iodine to an alignment of polyvinyl alcohol molecules, as described above. Within this range, the polarizing film can realize good polarization properties.

Further, the optical film may include a protective film stacked on at least one surface of the polarizing film. That is, the optical film may include a protective film stacked on one surface or both surfaces of the polarizing film. The protective film may be stacked thereon using a bonding agent, an adhesive or the like, which is publicly known in the art, and the adhesive or the bonding agent may be suitably selected depending upon a material of the protective film, and the like.

The protective film may include various films used as a polarizer protective film or a retardation film in the art. For example, the protective film may be a film including a material selected from the group consisting of cellulose such as triacetyl cellulose and diacetyl cellulose, polyester such as polyethylene terephthalate, polyethylene naphthalate and polybutylene terephthalate, cyclic polyolefin, polycarbonate, polyether, polysulfone, polyimide, polyimide, polyolefin, polyacrylate, polyvinyl alcohol, polyvinyl chloride, polyvinylidene chloride, acrylic materials, and mixtures thereof.

Method of Manufacturing Optical Film

According to one embodiment of the present invention, a method of manufacturing an optical film may include: dyeing a polyvinyl alcohol film with iodine or a dichroic dye; and stretching the polyvinyl alcohol film, wherein a stretching ratio before dyeing may be less than a stretching ratio after dyeing.

The stretching ratio before dyeing is less than the stretching ratio after dyeing, whereby the polarizing film can have an orthogonal transmittance of less than 0.5% at a wavelength of 405 nm to 735 nm, as set forth above.

In addition, the polarizing film may have an absolute value of a slope of 0.01 or less at a wavelength of 405 nm to 460 nm, as represented by Equation 1. Preferably, the absolute value of the slope of the polarizing film at a wavelength of 405 nm to 410 nm is adjusted to 0.01 or less, the slope being represented by Equation 1. Further, the absolute value of the slope of the polarizing film at a wavelength of 460 nm to 735 nm may be adjusted to 0.1 or less, the slope being represented by Equation 1. Preferably, the absolute value of the slope of the polarizing film at a wavelength of 730 nm to 735 nm is adjusted to 0.1 or less.

In the method according to the present invention, the stretching ratio is adjusted such that most stretching is performed after dyeing, whereby non-uniformity or localization of iodine can be reduced and iodine can be uniformly aligned in a linear form. Therefore, since the polarizing film has a better degree of alignment and lower orthogonal transmittance, an optical film including a polarizing film having good optical properties can be manufactured. Dyeing is a process of introducing and adsorbing iodine or a dye, a pigment or a mixture thereof, which exhibits dichroism, into the polyvinyl alcohol film. Iodine, dye or pigment molecules absorb light oscillating in a stretching direction of the polarizing film and transmit light oscillating in an orthogonal direction to the stretching direction, thereby obtaining polarized light having a specific oscillation direction.

Dyeing may be performed by dipping the polyvinyl alcohol in a solution of iodine or a dichroic material. For example, when dyeing is performed using iodine, the temperature of the iodine solution may range from 20° C. to 50° C. and dipping may be performed for 10 seconds to 300 seconds. When an aqueous solution of iodine is used as the iodine solution, an aqueous solution containing iodine ($I_2$) and iodine ions, for example, potassium iodide (KI) used as a dissolution aid may be used. In one embodiment, iodine ($I_2$) may be present in an amount of 0.01% by weight (wt %) to 0.5 wt % and potassium iodide (KI) may be present in an amount of 0.01 wt % to 10 wt %, based on the total weight of the aqueous solution.

Dyeing may further include swelling the polyvinyl alcohol film in a swelling bath. Swelling may be performed at a temperature of 40° C. to 80° C., for example, 50° C. to 75° C., or 60° C. to 70° C. Swelling serves to allow a dichroic material to be dyed into the polyvinyl alcohol film upon the dyeing process by making molecular chains of the polyvinyl alcohol film flexible and relaxed. Here, a swelling temperature is increased to around the glass transition temperature of the polyvinyl alcohol film, whereby a swelling ratio of the polyvinyl alcohol film can be increased by reducing an amount of crystals in the polyvinyl alcohol film and activating movement of molecules thereof. Thus, the dichroic material can have improved dyeing properties and can be uniformly dyed into the polyvinyl alcohol film, whereby the polyvinyl alcohol film can have high optical properties and good orthogonal transmittance when subsequently stretched.

The swelling ratio of the polyvinyl alcohol film may range from 130% to 270%. The polyvinyl alcohol film may be stretched in the process of swelling. Within these ranges of swelling ratio and stretching ratio, stain generation in the process of dyeing can be prevented without deterioration in properties of the polarizing film, and high transmittance of the polarizing film can be achieved together with improvement in uniformity of optical properties thereof. Swelling may be performed by a dry or wet method. In one embodiment, swelling may be performed in a swelling bath containing a swelling solution by a wet method.

In another embodiment, the method may further include crosslinking after dyeing.

After the polyvinyl alcohol film is dyed with molecules of iodine or the dichroic material in dyeing, the dichroic molecules are adsorbed onto a polymeric matrix of the polyvinyl alcohol film using boric acid, a borate or the like. For example, crosslinking may be performed by dipping the polyvinyl alcohol film in an aqueous solution of boric acid without being limited thereto. Crosslinking may also be performed by coating or spraying a solution onto the film.

The stretching ratio before dyeing may be less than the stretching ratio after dyeing by 40% or less, for example, 30% or less, or 20% or less. The stretching ratio before dyeing is less than the stretching ratio after dyeing by 40% or less, whereby the optical film including the polarizing film having good orthogonal transmittance and the degree of alignment as set forth above can be manufactured.

Stretching of the polyvinyl alcohol film may be performed by typical wet stretching and/or dry stretching in the art. In addition, the polyvinyl alcohol film may have a final stretching ratio of 5.0:1 or more, for example, 5.5:1 or more, or 6.0:1 or more.

Examples of dry stretching may include inter-roll stretching, heating roll stretching, compression stretching, tenter stretching, and the like, and examples of wet stretching may include tenter stretching, inter-roll stretching, and the like.

Wet stretching may be performed in alcohol, water or an aqueous solution of boric acid using a solvent, such as methyl alcohol and isopropyl alcohol, without being limited thereto.

Stretching temperature and time may be suitably selected depending upon a material of a film, a stretching ratio, a stretching method, and the like. In addition, stretching may be uniaxial or biaxial stretching. However, in order to manufacture a polarizing film bonded to a liquid crystal cell of a liquid crystal display described below, biaxial stretching may be performed to realize retardation properties.

In a further embodiment, in the method of manufacturing an optical film including a polarizing film, the polarizing film may be manufactured by stacking a polyvinyl alcohol film onto a base film, followed by dyeing and crosslinking.

In this embodiment, a stacked film may be formed by attaching the polyvinyl alcohol film to at least one surface of the base film, followed by dyeing and stretching the stacked film. The base film and the polyvinyl alcohol film may be attached to each other by attractive force therebetween or by a separate bonding agent used therebetween. When the base film is used, stretching at a higher stretching ratio can be performed and a thinner polarizing film can be safely manufactured without rupture.

In addition, when the base film is used, the method may further include obtaining a thin polarizing film by removing the base film, after stretching. Obtaining the thin polarizing film by removing the base film may be performed by detaching the polyvinyl alcohol film from the base film by applying peel force to the polyvinyl alcohol film, without being limited thereto.

The method may further include stacking a protective film onto at least one surface of the polarizing film. That is, the protective film may be stacked onto one or both surfaces of the polarizing film, thereby forming a polarizing plate. The process of stacking the protective film is not particularly limited and may be performed using a bonding agent, an adhesive or the like, which is well known in the art. The adhesive or the bonding agent may be suitably selected depending upon the material for the protective film or the like. In addition, the protective film may be a protective film well known in the art, and detailed descriptions of the protective film will be omitted since the details of the protective film have been described above.

Liquid Crystal Display

Although not shown separately, a liquid crystal display according to one embodiment of the present invention may include the optical film as set forth above.

In addition, the liquid crystal display may include a liquid crystal cell and a backlight unit.

The liquid crystal cell generally includes two substrates and a liquid crystal layer interposed between the substrates. Generally, a color filter, opposite electrodes and an alignment layer may be formed on one of the substrates, and a liquid crystal driving electrode, a wiring pattern, a thin film transistor device, an alignment layer and the like may be formed on the other substrate.

By way of example, the liquid crystal display may include a liquid crystal cell, a backlight unit, a lower polarizing plate disposed between the liquid crystal cell and the backlight unit, and an upper polarizing plate disposed at a visible side of the liquid crystal cell, wherein the lower or upper polarizing plate may include the optical film according to the embodiments of the present invention as set forth above.

The liquid crystal cell may include a liquid crystal panel including a first substrate, a second substrate, and a liquid crystal layer sealed between the first substrate and the second substrate. An operation mode of the liquid crystal cell may include, for example, a twisted nematic (TN) mode, or an electrically controlled birefringence mode. The electrically controlled birefringence mode may include a vertical alignment mode, an optically compensated bend (OCB) mode, an in-plane switching (IPS) mode, and the like.

Among these operation modes of the liquid crystal cell, the TN mode will be described by way of example. When no electric field is applied to the liquid crystal cell due to no voltage difference between a pixel electrode and a common electrode, major axes of liquid crystals of the liquid crystal cell can be arranged parallel to surfaces of the first substrate and the second substrate, and the liquid crystals of the liquid crystal cell can have a spirally 90° twisted structure from the first substrate to the second substrate.

Here, polarization of linearly polarized light can be changed by retardation due to anisotropy of indices of refraction of the liquid crystals as the linearly polarized light passes through the liquid crystals of the liquid crystal cell. A linear polarization direction of the light passing through the liquid crystal cell can be rotated by 90° by adjusting dielectric anisotropy ($\Delta\varepsilon$) and chiral pitch of the liquid crystals, a thickness of the liquid crystals, that is, a cell gap, or the like.

When an upper polarizing plate and a lower polarizing plate are disposed on the liquid crystal cell, transmission axes of polarizers of the polarizing plates may be orthogonal or parallel to each other.

The first substrate may be a color filter (CF) substrate. For example, the first substrate may include a black matrix for preventing light leakage, red, green and blue color filters, and a common electrode, which is formed of a transparent conductive oxide such as ITO or IZO and corresponds to an electric field generating electrode, on a lower surface of a base including a transparent insulation material such as glass or plastic.

The second substrate may be a thin film transistor (TFT) substrate. For example, the second substrate may include a thin film transistor, which includes a gate electrode, a gate insulating film, a semiconductor layer, a resistive contact layer and source/drain electrodes, and a pixel electrode, which is formed of a transparent conductive oxide such as ITO or IZO and corresponds to an electric field generating electrode, on a base including a transparent insulation material such as glass or plastic.

A plastic substrate capable of being used for the first and second substrates may include plastic substrates such as polyethylene terephthalate (PET), polycarbonate (PC), polyimide (PI), polyethylene naphthalate (PEN), polyether sulfone (PES), polyarylate (PAR) and cycloolefin copolymer (COC) substrates, which can be used for displays, without being limited thereto. In addition, the first substrate and the second substrate may include a flexible material.

The backlight unit may generally include a light source, a light guide plate, a reflective film, and the like. Backlight units can be divided into direct type, side light type, and sheet-light source type backlight units depending upon configuration thereof.

The optical film according to the present invention may be interposed between the backlight unit and the liquid crystal cell. In this case, the polarizing film included in the optical film can transmit only a light component oscillating in a specific direction among light components incident upon the polarizing film from the light source of the backlight unit.

In addition, the optical film according to the present invention may be disposed at a position opposite to a backlight of the liquid crystal cell. In this case, the optical film may be interposed between other components of the liquid crystal display, or may be located on a surface of the liquid crystal display.

Further, when the liquid crystal cell is located between two optical films, transmission axes of polarizing films of the optical films may be orthogonal or parallel to each other.

Hereinafter, the present invention will be described with reference to specific experimental data.

Preparative Example 1

A 20 μm thick polyvinyl alcohol (PVA) film (Kuraray Co., Ltd.) was stacked on a corona-treated surface of a polypropylene (PP) film via a PVA bonding agent, followed by drying at 75° C. for 2 minutes, thereby obtaining a stacked film. The stacked film was dipped in a bath for swelling at 60° C. for 125 seconds while tension of the film was maintained so as to prevent the film from sagging. Thereafter, the stacked film was dyed by dipping the stacked film in a solution of iodine and KI at room temperature for 213 seconds, in which the solution of iodine and KI was prepared in a weight ratio of iodine to KI of 1:23 such that the polyvinyl alcohol layer had a single substance transmittance of 40% to 45%. The dyed stacked film was subjected to crosslinking by dipping the stacked film in an aqueous solution containing 2 wt % of boric acid at room temperature for 109 seconds. Next, the stacked film was stretched at 60° C. for about 97 seconds in an aqueous solution containing 3 wt % of boric acid and 3 wt % of KI such that the stacked film had a final stretching ratio of 6 times an initial length thereof. The stretched stacked film was dried at 75° C. for 3 minutes, followed by removing the polypropylene (PP) film, thereby preparing a polarizing film.

Preparative Example 2

A polarizing film was prepared in the same manner as in Preparative Example 1 except that a 15 μm thick polyvinyl alcohol (PVA) film (Kuraray Co., Ltd.) was used.

Preparative Example 3

A 25 μm thick triacetyl cellulose (TAC) film including a UV absorber was stacked onto one surface of the polarizing film of Preparative Example 1 by application of a PVA bonding agent, followed by drying at 75° C. for 2 minutes, thereby preparing an optical film.

Preparative Example 4

A 40 μm thick triacetyl cellulose (TAC) film not including a UV absorber and a 40 μm thick cycloolefin polymer (COP) film not including a UV absorber were stacked onto one surface the polarizing film of Preparative Example 1 and the other surface by application of a PVA bonding agent, respectively, followed by drying at 75° C. for 2 minutes, thereby preparing an optical film.

Comparative Example 1

A polarizing film was prepared in the same manner as in Preparative Example 1 except that the swelling process was performed at 30° C. instead of 60° C.

Comparative Example 2

A polarizing film was prepared in the same manner as in Preparative Example 1 except that the swelling process was performed at 85° C. instead of 60° C.

Comparative Example 3

A polarizing film was prepared in the same manner as in Preparative Example 1 except that stretching was performed such that the final stretching ratio became 4.5 times instead of 6 times.

Comparative Example 4

A polarizing film was prepared in the same manner as in Preparative Example 1 except that uniaxial stretching was performed such that a stretching ratio in dyeing became 3 times, followed by performing additional stretching such that a final stretching ratio became 6 times.

Experimental Example

Each of the polarizing films and the optical films prepared in Preparative Examples and Comparative Examples was evaluated as to properties such as thickness, transmittance (single substance transmittance, orthogonal transmittance), degree of polarization, color value (ac), color value (bc), and degree of alignment ($R_f/R_{PVA}$ (%)). Results are shown in Table 1.

Thickness was measured using a digital gauge (Magnescale-LT30, SONY Co., Ltd.).

In addition, optical properties such as transmittance (single substance transmittance, orthogonal transmittance), degree of polarization, color value (ac), color value (bc), and color value (bc) were measured using a UV-vis spectrophotometer (V-7100, Jasco Co., Ltd.). Specifically, a sample was attached to a V-7100 dedicated jig having a circular central hole, followed by inserting the jig into a stage on which a polarizer attachment film holder was set, and then subjected to measurement of a UV-visible spectrum under the condition of C light source 2 degree visual field, thereby measuring a single substance transmittance Ts (%). Next, two polarizing plates were arranged such that absorption axes thereof were orthogonal to each other, followed by measuring an orthogonal transmittance Tc (%), the degree of polarization PE (%), and orthogonal color values (ac, bc).

Degree of polarization was calculated by PE (%)={(Ts-Tc)/(Ts+Tc)}½×100. The polarizing film suffers from less light leakage as the orthogonal transmittance Tc (%) thereof is lower than a target single substance transmittance Ts (%) thereof. In addition, the polarizing film has better optical properties with increasing degree of polarization and allows a true black color to be realized on a liquid crystal display as the crossed color values (ac, bc) thereof approach 0.

Further, based on the measured values of the orthogonal transmittance, a slope (%/nm) according to orthogonal transmittance change (%) with respect to wavelength change at 405 nm to 410 nm, and a slope (%/nm) according to orthogonal transmittance change (%) with respect to wavelength change at 730 nm to 735 nm were calculated.

Furthermore, the degree of alignment was measured using a retardation measurement device (KOBRA-WX100/IR, OSI Co., Ltd.). Specifically, the retardation measurement device is a polarization analyzer using a parallel Nicol rotation method and is used to calculate the degree of alignment by measuring retardation profiles of a polyvinyl alcohol base and urea from angle dependency of transmitted light intensity when a polarizer is rotated around a beam axis once in a parallel Nicol state while being irradiated with a single wavelength luminous flux.

In a specific method of measuring the degree of alignment, with a sample secured flat to a light source position, a measurement wavelength range and a measurement position are set and measurement was started. After completion of measurement, an overall order value for Rc/Ro is adjusted and the degree of alignment is calculated from a value obtained by storing data using an equation $(R_f/R_{PVA}) \times 100$.

TABLE 1

| | Ts (%) | Tc (%) at 405 nm | Tc (%) at 735 nm | PE | Color value (ac) | Color value (bc) | Slope (%/nm) at 405 nm to 410 nm | Slope (%/nm) at 730 nm to 735 nm | Degree of alignment $R_f/R_{PVA}$ (%) |
|---|---|---|---|---|---|---|---|---|---|
| Preparative Example 1 | 42.47 | 0.01 | 0.04 | 99.998 | 0.15 | −0.29 | 0.001 | 0.00 | 46% |
| Preparative Example 2 | 42.44 | 0.05 | 0.10 | 99.996 | 0.12 | −0.24 | 0.003 | 0.01 | 33% |
| Preparative Example 3 | 42.45 | 0.01 | 0.22 | 99.994 | 0.12 | −0.15 | 0.001 | 0.02 | 26% |
| Preparative Example 4 | 42.48 | 0.01 | 0.06 | 99.997 | 0.14 | −0.25 | 0.001 | 0.01 | 38% |
| Comparative Example 1 | 42.45 | 0.52 | 2.54 | 99.970 | 1.67 | −4.17 | 0.027 | 0.15 | 18% |
| Comparative Example 2 | | | | PVA dissolved - Unable to test | | | | | |
| Comparative Example 3 | 42.40 | 2.65 | 9.09 | 99.983 | 0.57 | −5.45 | 0.088 | 0.35 | 17% |
| Comparative Example 4 | 42.49 | 0.15 | 1.40 | 99.989 | 1.24 | −1.11 | 0.010 | 0.08 | 19% |

As shown in Table 1, it could be confirmed that the polarizing films of Preparative Examples exhibited better optical properties than the polarizing films of Comparative Examples and could realize a color close to true black.

In FIGS. 1 and 2, the measured orthogonal transmittance (Tc) of each of the polarizing films of Preparative Examples 1 to 4 and Comparative Examples 1, 3 and 4 was shown in a graph having horizontal and vertical axes indicating measurement wavelength and orthogonal transmittance, respectively.

As shown in FIGS. 1 and 2, it could be confirmed that the slopes of the polarizing films of Comparative Examples were greater than those of the polarizing films of Preparative Examples according to the present invention at each point.

It should be understood that the foregoing embodiments are provided for illustration only and different embodiments can be applied in combination.

The invention claimed is:

1. An optical film comprising:
a polarizing film having an absolute value of a slope of 0.01 or less at a first wavelength range of 405 nm to 460 nm and an absolute value of a slope of 0.1 or less at a second wavelength range of 730 nm to 735 nm on a graph having horizontal and vertical axes indicating measurement wavelength and orthogonal transmittance, respectively, the slope in each of the first and second wavelength ranges being represented by Equation 1:

Slope (%/nm)=(Orthogonal transmittance change amount (%))/Wavelength change amount (nm))  (Equation 1).

2. The optical film according to claim 1, wherein the polarizing film has a thickness of 0.5 μm to 15 μm.

3. The optical film according to claim 1, wherein the polarizing film has a degree of alignment of 20% to 48%.

4. The optical film according to claim 1, comprising:
a protective film bonded to one surface of the polarizing film.

* * * * *